Feb. 9, 1937. K. O. KELLER 2,070,306
WELDED FABRICATED STRUCTURAL MEMBERS
Filed Nov. 16, 1933 3 Sheets-Sheet 1
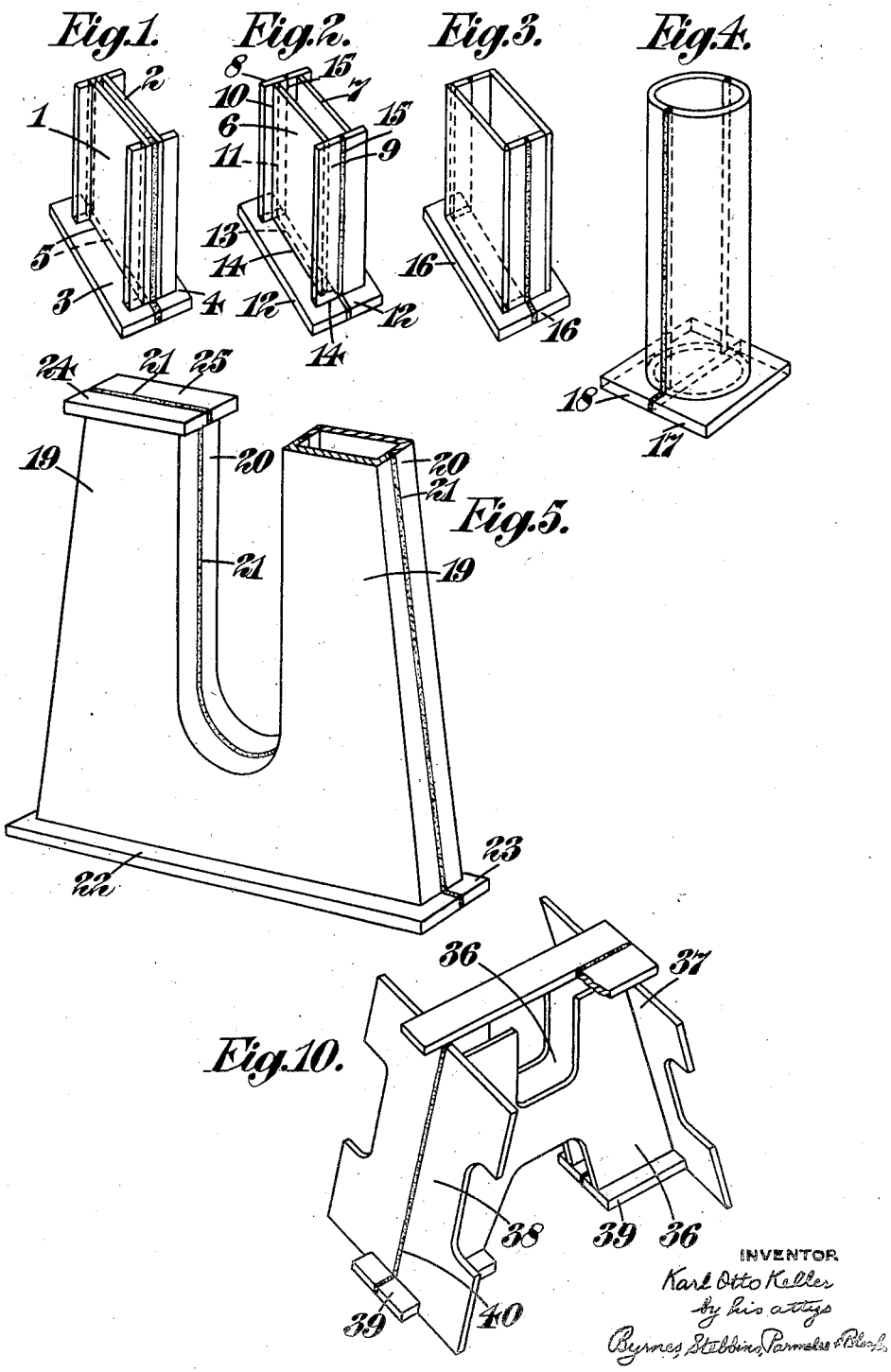
INVENTOR.
Karl Otto Keller
by his attys
Byrnes, Stebbin, Parmelee & Block

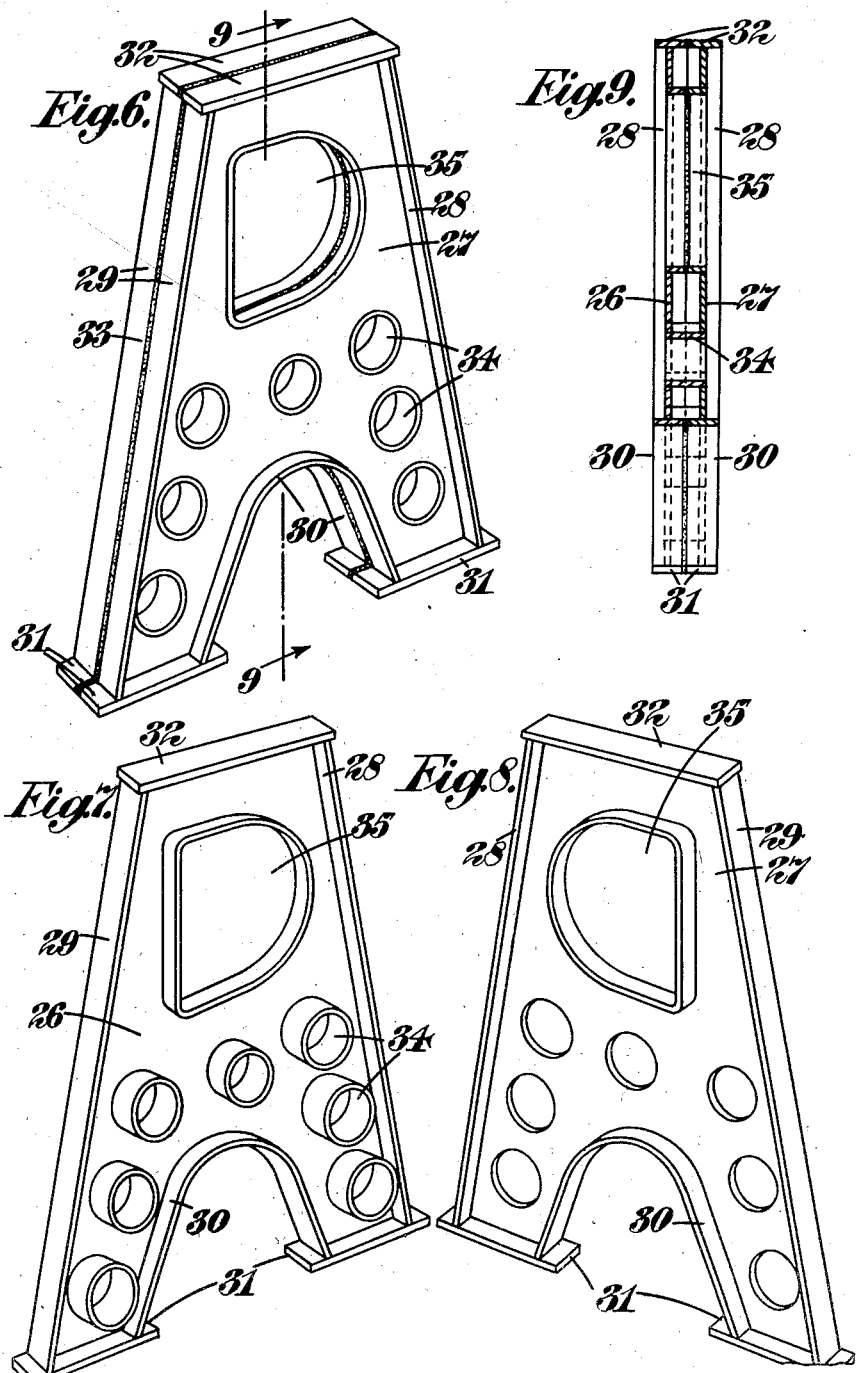

Feb. 9, 1937. K. O. KELLER 2,070,306
WELDED FABRICATED STRUCTURAL MEMBERS
Filed Nov. 16, 1933   3 Sheets-Sheet 3

INVENTOR
Karl Otto Keller
by his attys
Byrnes, Stebbing, Parmelee & Blenko

Patented Feb. 9, 1937

2,070,306

UNITED STATES PATENT OFFICE 2,070,306

WELDED FABRICATED STRUCTURAL MEMBER

Karl Otto Keller, Sunderland, England, assignor to William Doxford & Sons, Limited, Sunderland, England, a British company Application November 16, 1933, Serial No. 698,272
In Great Britain January 17, 1933

2 Claims. (Cl. 189—36)

This invention relates to welded fabricated structural members of steel.

The construction of welded fabricated steel members is not of itself new but it has been found in such members, especially in those subjected to alternating stresses as in engine columns, difficult to provide sufficient strength of weld at the places where a top or bottom flange or other attachment is welded to the main member with an edge-surface of one abutting and welded to a face-surface of the other.

In the case of a plain H-section column, welding has formerly been effected round the whole exterior contour of the cross-section, but the strength of the weld has been found to be not equal to that of the section, because the length of contour of the weld has been too short.

In order to increase the strength of the weld it has previously been found necessary to increase the "run" or total length of the weld by adopting a section giving a much longer exterior contour than usual, such, for example, as the long exterior contour of a double H-section or of a box section; but even with this amount of elongation of contour it has usually been found impossible to effect the welding properly throughout the complete length of the elongated contour because the second contour, i. e. that of the inside of the double H or of the box is usually inaccessible.

It is the purpose of the present invention to overcome this difficulty by providing an adequate "run" or total length of weld which will give a joint of a strength comparable with, or suited to, that of the constituent members of the structure.

The invention is illustrated in the accompanying drawings, in which—

Figures 1, 2, 3, and 4 are perspective views of short columns each with an attachment consisting of a bottom flange welded to it;

Figure 5 is a view of an engine support with a central gap and with a foot attached to its bottom by welding, and flat plates (of which only one is shown) welded to its two upper ends;

Figure 6 shows another engine support with welded side-flanges and feet and top;

Figures 7 and 8 are views showing the two parts of the support illustrated in Figure 6, before they are finally welded together as a unitary structural member;

Figure 9 is a vertical sectional elevation on the lines 9—9 of Figure 6;

Figure 10 shows another engine support with certain parts omitted;

Figure 11:
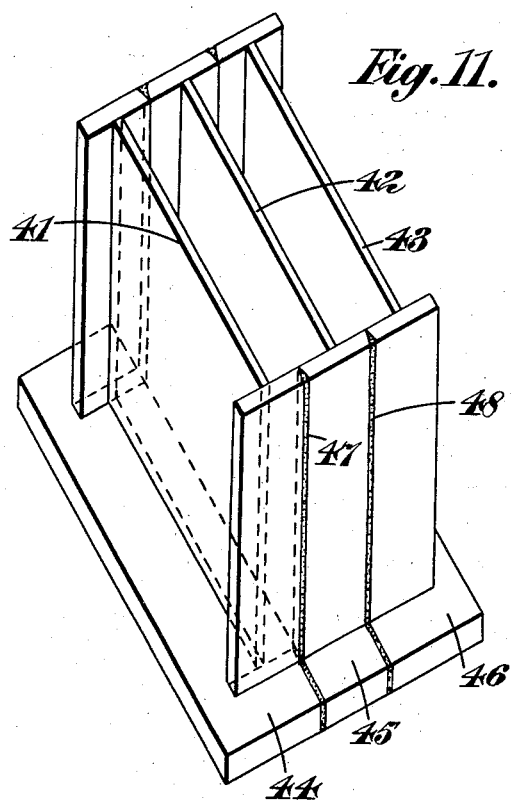
Figure 11 shows a modified construction of the column illustrated in Figure 2.

In the construction illustrated in Figure 1, the column is constituted by two parts, 1 and 2 which originally are distinct from one another and have each an end flange or attachment, 3 and 4 respectively welded to it along the whole contour of the edge (shown by the line 5, full and dotted). Since the parts 1 and 2 are initially separate the whole of the contour is available for such welding, and the two individual elements thus formed, namely, 1 and 3, as one element and 2 and 4 as the other element are subsequently welded together side by side so as to constitute a unitary structural member; the two parts 3 and 4 which together constitute the end flanges are also welded together during the last mentioned operation. In Figure 1 the two parts of the column are shown as U-section girders placed base to base.

In Figure 2 a similar construction is shown embodying two H-girders. The two webs 6 and 7 originally distinct are each made up to H-section, with its flanges 8 and 9 welded along two contours 10 and 11 to its web, in the completion of the H-section. A base or foot 12 is also welded to each section along an internal (13) and external (14) contour-line. The two halves of the column thus constituted, and bearing the feet 12, welded to them, are placed together and finally united by welding along the weld 15.

In Figure 3 the completed column is of a plain box section. Its feet 16 are united to the rest of the column by internal and external welding as in Figure 2.

Figure 4 resembles Figure 3 and shows a column of circular cross-section with a foot made up by two halves 17 and 18 each welded to it along the internal and external contours of the circular section; Figure 5 is an engine support of which the two halves 19, 20 are united by a single weld 21 extending completely around it as shown, and the halves 22, 23 constituting the base flange and the plates 24, 25 of a top flange are each united by an endless weld around the internal as well as the external contour of the parts 19, 20 respectively, as previously described.

Figure 6 shows a completed structural member for an engine frame, constructed in two parts which are shown separated in Figures 7 and 8. This member comprises two main plates 26, 27 each of which has flanges 28, 29, 30 welded to it as in an H-section girder; base plates or feet 31 and top plates 32 are also welded to lower and upper ends of these plates, this welding extending along the whole contour of the plate and its flanges, including that part of the contour which is external and that part which is internal when the member is finally assembled together. The two plates 26, 27 each with its various attachments welded to it are placed face to face and welded round the whole contour along the line 33 (see Figure 6). When the plate members 26, 27 are large and require stiffening, they may be braced together by tubular stays 34 which are welded to one of the plates initially and welded to the other plate when the two plates are assembled together. Similarly, any other openings in the plates, such as at 35, may be provided with flanges which are welded respectively to the two plates and to one another when the two plates are assembled, or, if desired, the single flange can be secured to both plates in the manner of the stays 34 aforesaid.

Instead of tubular stays 34 bars or plates or any other desired reinforcement can be used.

Figure 10 shows yet another construction of engine support in accordance with this invention. Two plates 36 shaped to suit the purpose for which they are required each have flanges 37, 38 welded to them in the manner of an H-section girder; base plates 39 are welded to each of the plates 36 and to its flanges, such welding extending around the whole available contour when the plates 36 are separated. When each plate with its various attachments welded to it is complete, the two are placed together and welded together along the line 40 so as to constitute a unitary structural member.

In all the constructions so far described the structural member has been composed of two main parts, but the invention is not limited thereto; Figure 11 shows a column similar to Figure 2 but comprising three H-section members 41, 42, 43, instead of two H-section members. These three H-sections have welded to them the respective portions 44, 45, 46 which together constitute an end flange or foot for the column. Each of the portions aforesaid is welded to its cooperating H-section member around the whole contour of the section thereof, and three individual elements thus formed are welded together side by side along the lines 47, 48.

Figure 12:
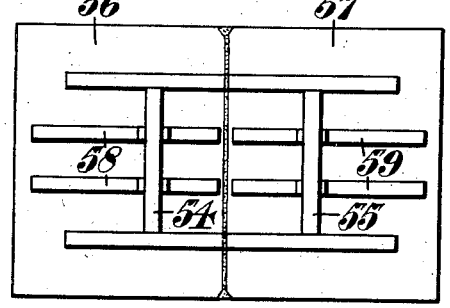
Figure 12 is a plan of yet another modified construction of column showing the arrangement of column and the flange which constitutes its foot.

Figure 12 is an inverted plan view of a composite column in which two H-section members 54, 55 each has an end flange 56, 57 respectively welded to it and reinforced by gusset plates 58, 59 as just described, the two units thus formed being finally welded together similarly to the construction shown in Figure 2.

It will be seen that this invention provides an improved method of fabricating welded structural members in which the maximum length or run of weld is rendered available so as to obtain adequate strength.

I claim:

1. The method of securing the face of an end plate to the end of a longitudinal member in which portions of the faces of the plate and the said member along the joint are inaccessible when assembled, comprising forming a plurality of separate parts which when assembled will form a complete end of a longitudinal member, forming a plate of a plurality of parts which when assembled will form a complete plate for the end of the longitudinal member, assembling a part of the plate with each part of the longitudinal member and matching the edges of said parts, welding said plate parts to the ends of the parts of the longitudinal members around the entire peripheral edge of the ends of the parts of the longitudinal member, then assembling the parts of the longitudinal member with the parts of the end plate welded thereto, and then welding the parts of the longitudinal members and the parts of the plate to each other.

2. A built up metallic element having an end plate welded to the end of a longitudinal member over an inaccessible space between faces of the longitudinal member, said element having a welded seam, in substantially the same plane, extending through the plate and into the end of the longitudinal member, a weld extending along the edge of the end of the longitudinal member and the face of the plate in said space, and a weld extending along the edge of the end of the longitudinal member and the face of the plate opposite the weld in said space.

KARL OTTO KELLER.